United States Patent
Mori et al.

[11] Patent Number: 5,889,358
[45] Date of Patent: Mar. 30, 1999

[54] VIBRATION GYROSCOPE

[75] Inventors: Akira Mori, Nagaokakyo; Kenjiro Okaguchi, Shiga-ken; Yoshio Kawai, Ibaraki; Jiro Miyazaki, Kusatsu, all of Japan

[73] Assignee: Murata Manufacturing Co., Ltd., Japan

[21] Appl. No.: 729,041

[22] Filed: Oct. 10, 1996

[30]     Foreign Application Priority Data

Oct. 11, 1995  [JP]  Japan ................................ 7-263046

[51] Int. Cl.⁶ ............................. G01C 19/00; H01L 41/08
[52] U.S. Cl. ...................... 310/348; 310/351; 310/352; 310/367; 73/504.14
[58] Field of Search ............................... 310/321, 326, 310/348, 367, 351, 352; 73/493, 662, 504.12, 504.14, 514.29, 504.29

[56]            References Cited

U.S. PATENT DOCUMENTS

| 5,015,554 | 5/1991 | Terada et al. ........................... 310/370 |
| 5,256,929 | 10/1993 | Terajima ................................. 310/326 |
| 5,345,822 | 9/1994 | Nakamura et al. ...................... 310/316 |
| 5,395,873 | 3/1995 | Mizoule .................................. 524/388 |
| 5,491,335 | 2/1996 | Bucholtz et al. .................. 250/227.25 |
| 5,493,166 | 2/1996 | Kasanami et al. ....................... 310/351 |
| 5,521,456 | 5/1996 | Mori et al. .............................. 310/326 |
| 5,569,969 | 10/1996 | Kasanami et al. ...................... 310/345 |
| 5,574,219 | 11/1996 | Heinouchi ............................... 310/321 |
| 5,635,647 | 6/1997 | Heinouchi ............................... 310/321 |

FOREIGN PATENT DOCUMENTS

| 520467A2 | 6/1992 | European Pat. Off. ........ G01C 19/56 |
| 4203927 | 7/1992 | European Pat. Off. ........ G01C 19/56 |
| 0621653 | 4/1994 | European Pat. Off. ......... H01Q 1/27 |
| 660081A1 | 12/1994 | European Pat. Off. ........ G01C 19/56 |
| 0707354 | 9/1995 | European Pat. Off. ......... H01Q 9/04 |
| 5-18754 | 1/1993 | Japan ................................. 73/504.12 |
| 6-249668 | 9/1994 | Japan ..................................... 310/348 |
| 6-258080 | 9/1994 | Japan ..................................... 310/348 |

*Primary Examiner*—Thomas M. Dougherty
*Attorney, Agent, or Firm*—Ostrolenk, Faber, Gerb & Soffen, LLP

[57]            ABSTRACT

In a vibration gyroscope 1, a vibrator 2 is mounted to a mounting substrate 7 through support pins 6a and 6b. The mounting substrate 7 and a support substrate 10 are disposed opposite by inserting protrusions 11a and 11b of the support substrate 10 into second insertion holes 9a and 9b of the mounting substrate 7 and by supporting the mounting substrate 7 with convex molded sections 14a and 14b. The space between the substrates 7 and 10 are filled with elastic paste made up of synthetic resin such as urethan and silicone, or the like. The paste is dried to form a vibration absorbing member 13. Alternatively, the vibration absorbing member 13 is formed on the surface of a mounting substrate 22.

23 Claims, 4 Drawing Sheets

VIBRATION GYROSCOPE

BACKGROUND OF THE INVENTION

1. Field of the Invention

The present invention relates to a vibration gyroscope which can be used for a navigation system that gives an appropriate guide by detecting a rotation angular velocity to detect the position of a moving object, or used for an anti-vibration system, such as a camera-shake prevention apparatus that correctly prevents a shake by detecting a rotation angular velocity due to external vibration, such as camera shake.

2. Description of the Related Art

The configuration of a conventional vibration gyroscope will be described by referring to FIGS. 6 and 7.

In the figures, a vibration gyroscope 31 includes a vibrator 32. The vibrator 32 is formed in a regular triangular prism shape by, for example, permanently elastic metal materials, such as elinvar, and materials generating mechanical vibration, such as quartz, glass, crystal, and ceramic. Piezoelectric elements 33 and 34 for driving and detection are provided at side faces adjacent to each other, and a feedback piezoelectric element 35 is provided at the other side face. The piezoelectric elements 33 to 35 are made by providing boards made from piezoelectric members with electrodes on both surfaces, although they are not shown in detail. Near a node of the vibrator 32 and on the ridgeline located between the piezoelectric elements 33 and 34, the middle sections of two support pins 36 serving as support members are mounted. The support pins 36 are made of metal wire formed in a gate shape. Both ends of the support pins 36 are inserted into first insertion holes 38 provided for a mounting substrate 37 and secured by solder or the like. The mounting substrate 37 is made by molding a plane plate from, for example, glass epoxy, and by providing the first insertion holes 38 and a second insertion hole 39 both penetrating the two main surfaces. The second insertion hole 39 is formed more outward than the first insertion holes 38 on the main surfaces of the mounting substrate 37. Opposing the mounting substrate 37, a support substrate 40 is disposed. The support substrate 40 is made by injection molding a plane plate from a metal, such as nickel. In the support substrate 40, a protrusion 41 is perpendicularly extended from one main surface, and a convex section 43 is formed for positioning the mounting substrate 37 on the surface of section 43 in the vicinity of the protrusion 41. In addition, at four corners on the other main surface, hook-shaped legs 42 are provided in order to engage the vibration gyroscope with other members. The protrusion 41 of the support substrate 40 is inserted into the second insertion hole 39 of the mounting substrate 37 and secured by solder or the like, and the mounting substrate 37 is supported by the convex molded section 43. Therefore, the mounting substrate 37 and the support substrate 40 are secured through a gap 44 while they oppose each other.

Since the gap 44 is provided between the mounting substrate 37 and the support substrate 40 in the vibration gyroscope 31, vibration transferred to the mounting substrate 37 from the vibrator 32 through the support pins 36 is prevented from transferring to the support substrate 40.

Another conventional vibration gyroscope will be described below by referring to FIG. 8. Portions which are the same as or corresponding to those shown in FIG. 6 are indicated by the same symbols and the descriptions thereof are omitted.

In a vibration gyroscope 51 shown in FIG. 8, a support substrate 52 and a mounting substrate 53 are not provided with a protrusion or a second insertion hole. Both the substrates 52 and 53 are combined with adhesive or the like through a cushion plate 54 which is made by molding an elastic member, such as butyl rubber, into a plane plate. Since the cushion plate 54 absorbs vibration, vibration transferred to the mounting substrate 53 from the vibrator 32 through the support pins 36 is suppressed.

The conventional vibration gyroscopes have the following problems.

In the vibration gyroscope 31, vibration to be transferred from the mounting substrate 37 to the support substrate 40 can be suppressed. However, vibration transferred from the vibrator 32 to the mounting substrate 37 cannot be suppressed, and vibration leakage from the vibrator 32 cannot be sufficiently reduced. As a result, vibration in the vibrator 32 is not stable and the characteristics of the vibration gyroscope may deteriorate.

In the vibration gyroscope 51, vibration to be transferred from the vibrator 32 to the mounting substrate 53 can be suppressed by the cushion plate 54. Since the cushion plate 54 is an independent member, assembly work becomes complicated.

SUMMARY OF THE INVENTION

Accordingly, it is an object of the present invention to provide a vibration gyroscope having a structure which does not require complicated assembly work and which suppresses transfer of vibration from the vibrator to the mounting substrate.

The foregoing object is achieved through the provision of a vibration gyroscope having a column-shaped vibrator; a support member for supporting the vibrator at a location which is approximately at its node; a mounting substrate to which the support member is mounted; and a support substrate which is disposed opposite the mounting substrate, wherein a vibration absorbing member for absorbing vibration transferred to the mounting substrate from the vibrator through the support member is provided, and the vibration absorbing member is formed by an elastic paste.

The vibration absorbing member may be provided between the mounting substrate and the support substrate.

The vibration absorbing member may be mounted on a main surface of the mounting substrate, where the support member is mounted.

A vibration gyroscope according to the present invention does not require complicated assembly work. A structure in which vibration transferred from the vibrator to the mounting substrate is absorbed can be obtained without any complicated assembly work.

In a gyroscope according to the present invention, vibration transferred to the mounting substrate from the vibrator through the support member is suppressed by the vibration absorbing member. Therefore, vibration leakage from the vibrator is reduced and stable vibration is obtained in the vibrator. As a result, the desired characteristics of the vibration gyroscope is obtained. In addition, since the vibration absorbing member is formed by an elastic paste, complicated assembly work is not required, unlike that required when using an independent member, such as the member 54 in the vibration gyroscope 51.

Other features and advantages of the present invention will become apparent from the following description of the invention which refers to the accompanying drawings.

DESCRIPTION OF THE PREFERRED EMBODIMENTS

Figure 1:
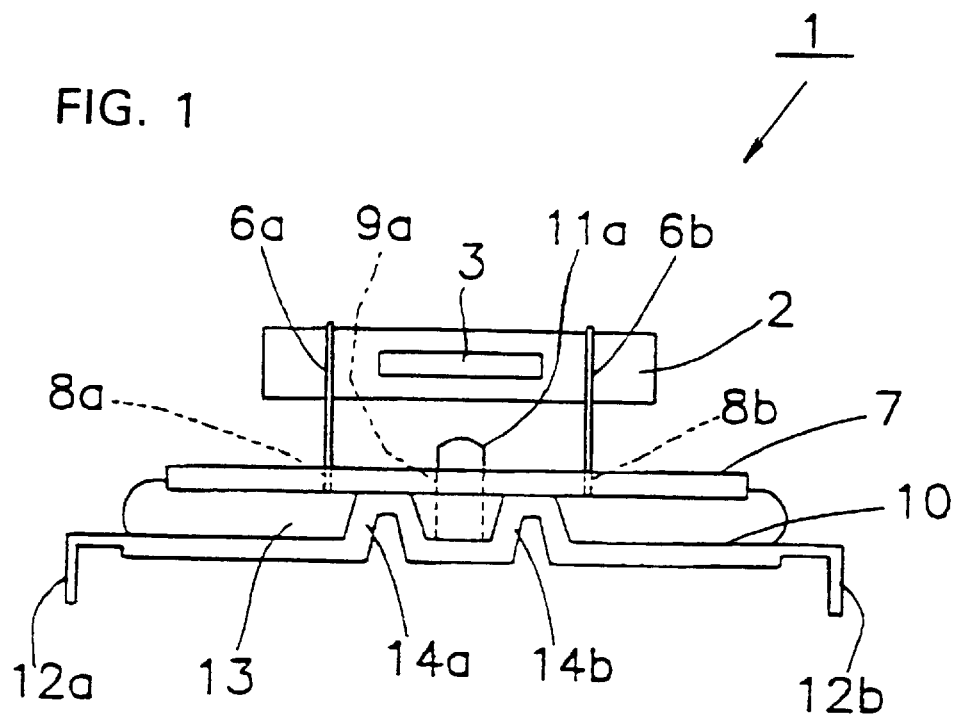
FIG. 1 is a side view of a vibration gyroscope according to a first embodiment of the present invention with parts removed for the sake of clarity.
Figure 2:
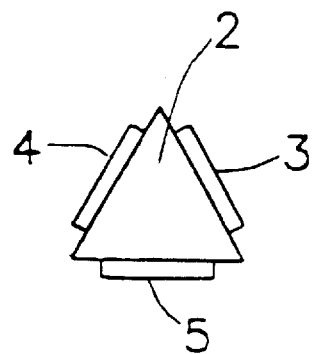
FIG. 2 is an end view of a vibrator used in the vibration gyroscope shown in FIG. 1.
Figure 3:
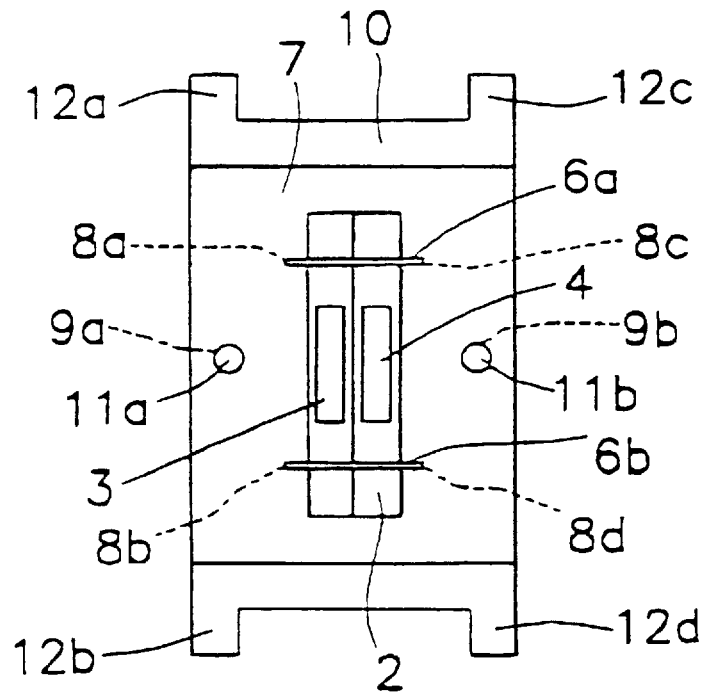
FIG. 3 is a plan view of the vibration gyroscope shown in FIG. 1.

A vibration gyroscope according to a first embodiment of the present invention will be described below by referring to FIGS. 1 to 3.

In the figures, a vibration gyroscope 1 includes a vibrator 2. The vibrator 2 is formed in a regular triangular prism shape by, for example, permanently elastic metal materials, such as elinvar and materials generating mechanical vibration, such as quartz, glass, crystal, and ceramic. Piezoelectric elements 3 and 4 for driving and detection are provided at side faces adjacent to each other by means of adhesion or the like, and a feedback piezoelectric element 5 is provided at the other side face by means of adhesion or the like. The piezoelectric elements 3 to 5 are made by providing boards made up of piezoelectric members with electrodes on both surfaces although they are not shown in detail.

Near a node of the vibrator 2 and on the ridgeline located between the piezoelectric elements 3 and 4, the middle sections of two support pins 6a and 6b serving as support members are glued with the use of adhesive or the like. The support pins 6a and 6b are made of metal wire, such as tungsten wire, formed in a gate shape, i.e., an inverted square U-shape. Both ends of the support pins 6a and 6b are inserted into first insertion holes 8a to 8d provided in a mounting substrate 7 and secured by solder or the like. The mounting substrate 7 is made by molding a plane plate from, for example, glass epoxy, and by providing the first insertion holes 8a to 8d and second insertion holes 9a and 9b. The mounting substrate 7 is disposed such that it opposes a support substrate 10. The support substrate 10 is made by molding a plane plate from a metal such as nickel. In the support substrate 10, protrusions 11a and 11b are perpendicularly extended from one main surface, and convex molded sections 14a and 14b which oppose each other with the protrusions 11a and 11b disposed therebetween are formed on the surface by injection molding at a part of the surface. In addition, at four corners on the other surface, hook-shaped legs 12a to 12d are provided in order to engage the vibration gyroscope 1 with other members. The protrusions 11a and 11b of the support substrate 10 are inserted into the second insertion holes 9a and 9b of the mounting substrate 7 and secured by solder or the like, and the mounting substrate 7 is supported by the convex molded sections 14a and 14b. Therefore, the mounting substrate 7 and the support substrate 10 are secured in a condition in which they oppose each other. The convex molded sections 14a and 14b of the support substrate 10 are used for positioning the mounting substrate 7 when it is placed. The sections are provided in the vicinity of the center of a main surface of the support substrate 10, that is, near the protrusions 11a and 11b.

The space between the mounting substrate 7 and the support substrate 10 excluding the protrusions 11a and 11b and the convex molded sections 14a and 14b is filled with elastic paste made up of synthetic resin, such as urethane and silicone, or the like, to form a vibration absorbing member 13.

In the gyroscope 1, vibration transferred to the mounting substrate 7 from the vibrator 2 through the support pins 6a and 6b is suppressed by the vibration absorbing member 13. Therefore, vibration leakage from the vibrator 2 is reduced and stable vibration is obtained in the vibrator 2. As a result, the desired characteristics of the vibration gyroscope is obtained. In addition, since the vibration absorbing member 13 is formed by filling the space with paste, complicated assembly work is not required, unlike an independent member.

Figure 4:
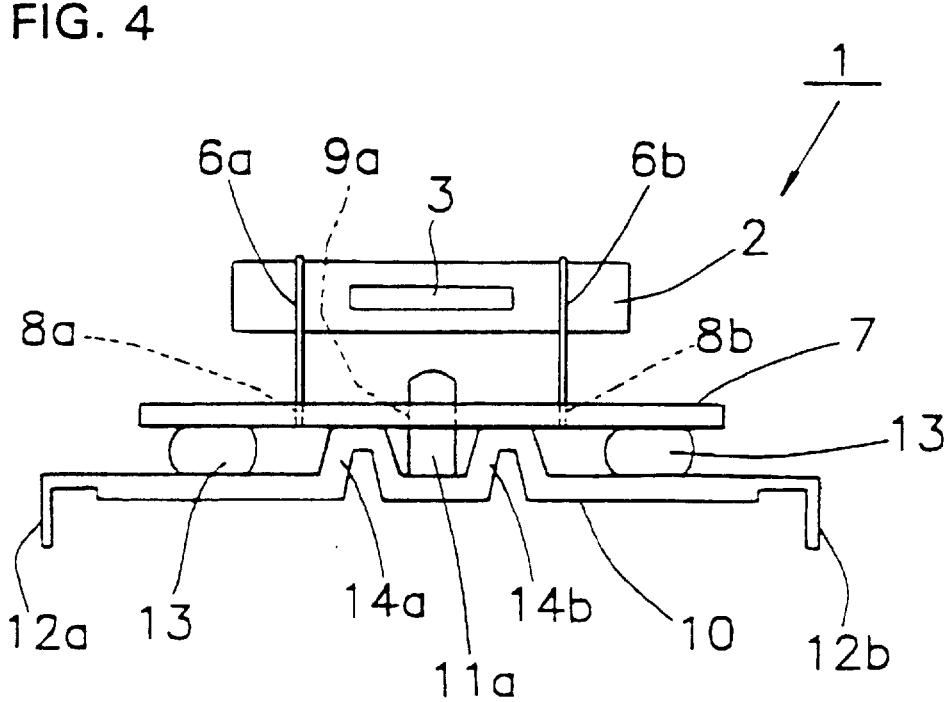
FIG. 4 is a side view of a modified vibration gyroscope according to the first embodiment of the present invention with parts removed for the sake of clarity.

As shown in FIG. 4, the vibration absorbing member 13 may be provided at a part of the space between the mounting substrate 7 and the support substrate 10. In FIG. 4, the vibration absorbing member 13 is provided at two points between the substrates 7 and 10. The number of the vibration absorbing members 13 and the position where the vibration absorbing member 13 is produced are not specified.

Figure 5:
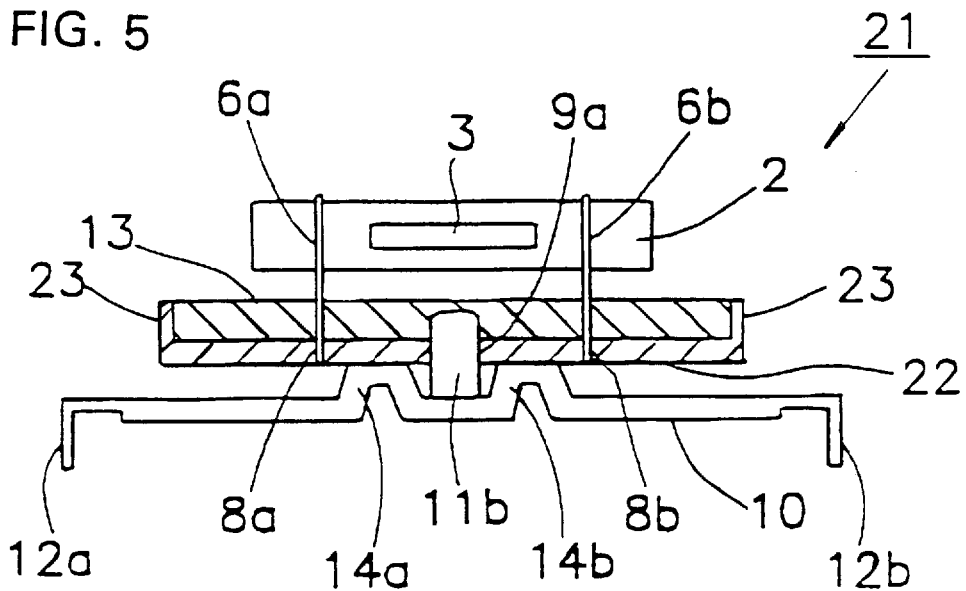
FIG. 5 is a partially cross-sectional side view of a vibration gyroscope according to a second embodiment of the present invention with parts removed for the sake of clarity.
Figure 6:
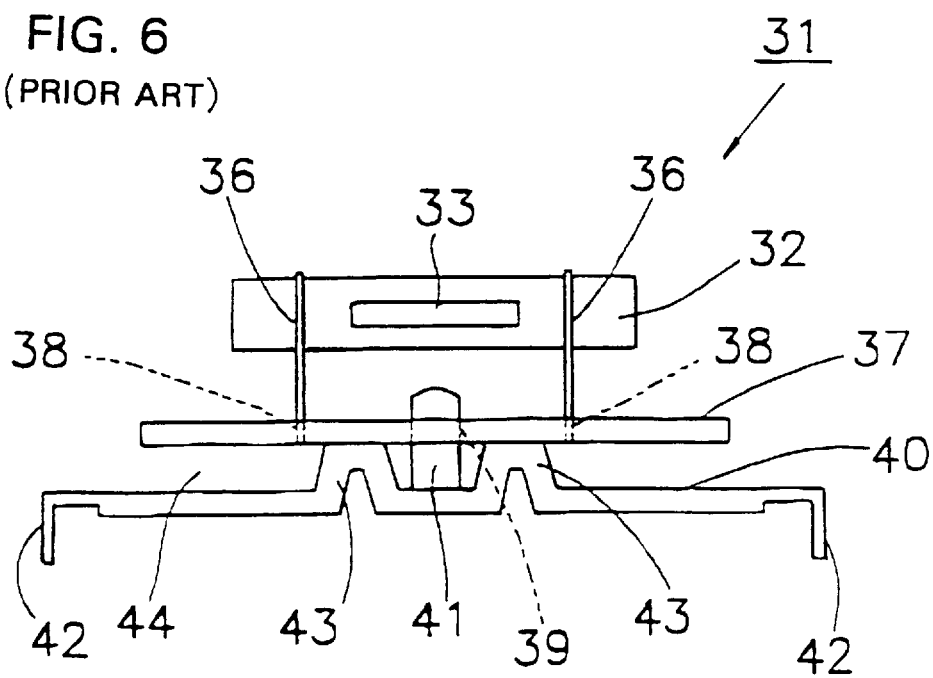
FIG. 6 is a side view of a conventional vibration gyroscope with parts removed for the sake of clarity.
Figure 7:
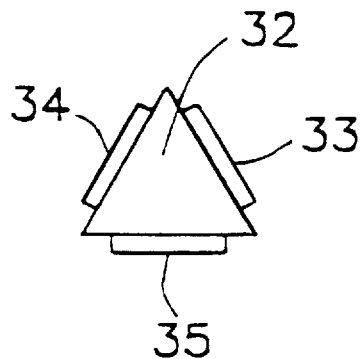
FIG. 7 is an end view of a vibrator used in the vibration gyroscope shown in FIG. 6.
Figure 8:
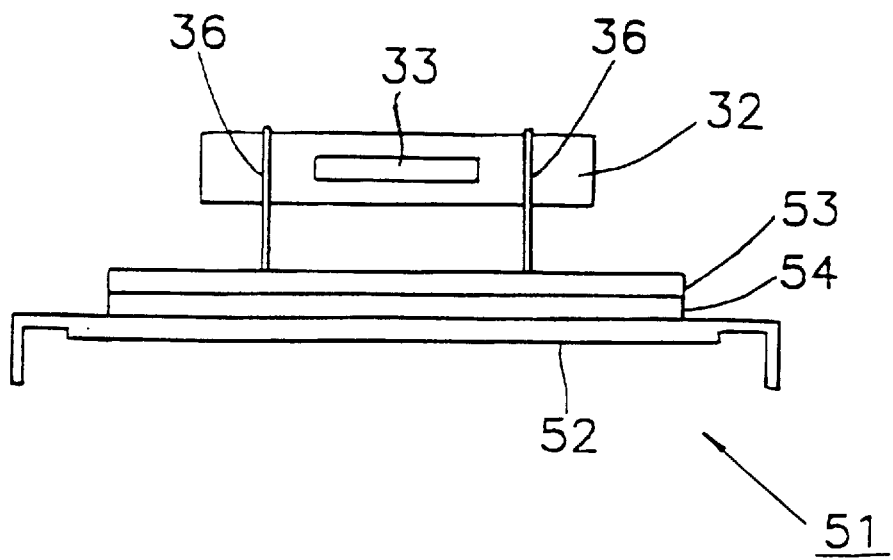
FIG. 8 is a side view of another conventional vibration gyroscope with parts removed for the sake of clarity.

A vibration gyroscope according to a second embodiment of the present invention will be described below by referring to FIG. 5. Portions which are the same as or corresponding to those shown in FIG. 1 are indicated by the same symbols in FIG. 5, and the descriptions thereof will be omitted. FIG. 5 is a side view of a vibration gyroscope. Only a mounting substrate and a vibration absorbing member are shown by their cross sections.

In a vibration gyroscope 21 in the figure, a vibrator 2 is mounted to a mounting substrate 22 through support pins 6a and 6b. Around the positions where the support pins 6a and 6b are mounted on a main surface of the mounting substrate 22, a jaw 23 is extended perpendicularly to the surface. The inside of the jaw 23 is filled with elastic paste made up of synthetic resin or the like. The paste is dried to form a vibration absorbing member 13. Therefore, the support pins 6a and 6b are secured to the mounting substrate 22 in a condition in which both pins are inserted into the vibration absorbing member 13 at around both ends thereof.

The jaw 23 of the mounting substrate 22 is mainly provided in order to facilitate work for filling with paste to form the vibration absorbing member 13 in the manufacturing process, and it is not essential to implement this invention.

In the vibration gyroscope 21 configured as described above, since vibrations transferred to the support pins 6a and 6b from the vibrator 2 are suppressed by the vibration absorbing member 13 before they are transferred to the mounting substrate 22, vibrations transferred to the mounting substrate 22 are further weaker than those in the first embodiment. Since the vibration absorbing member 13 is formed by applying paste, in the same way as in the first embodiment, complicated assembly work is not required.

In this embodiment, a vibrator having a shape of a column whose cross section is an equilateral triangle is used. The present invention can also be applied to a vibration gyroscope including a vibrator having a shape of a column whose cross section is a quadrangle or other shapes.

In the above embodiments, support pins are used as support members for a vibrator. The support member is not limited to a pin-shaped element. A plate-shaped element, for example, may be used.

In the above embodiments, the vibration absorbing member is provided between the mounting substrate and the support member, or the vibration absorbing member is provided on a surface of the mounting substrate. This invention also includes a vibration gyroscope in which vibration absorbing members are provided between the mounting substrate and the support substrate, and also on a surface of the mounting substrate.

A material used for the vibration absorbing member can be paste, and any materials which are elastic may be used.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A vibration gyroscope having: a column-shaped vibrator; a support member for supporting said vibrator at a location which is approximately its node; a mounting substrate to which said support member is mounted; and a support substrate which is disposed opposite said mounting substrate, said support substrate including at least a first extending element, said mounting substrate being supported on said first extending element
wherein a vibration absorbing member for absorbing vibration transferred to said mounting substrate from said vibrator through said support member is provided, said vibration absorbing member being made of an elastic paste and being in contact with said mounting substrate.

2. A vibration gyroscope according to claim 1, wherein said vibration absorbing member is provided between said mounting substrate and said support substrate.

3. A vibration gyroscope according to claim 2, wherein said elastic paste is selected from the group consisting of urethane and silicone.

4. A vibration gyroscope according to claim 3, wherein said support member includes at least a first gate-shaped element defining support pins and said mounting substrate includes at least first holes for receiving said support pins of said first gate-shaped element.

5. A vibration gyroscope according to claim 4, wherein said support member includes a second gate-shaped element defining support pins and said mounting substrate includes second holes for receiving said support pins of said second gate-shaped element.

6. A vibration gyroscope according to claim 5 wherein said support substrate includes a second extending element, said mounting substrate being supported on said first and second extending elements.

7. A vibration gyroscope according to claim 6 wherein said support substrate further includes at least a first protrusion and said mounting substrate includes at least a first opening for receiving said first protrusion.

8. A vibration gyroscope according to claim 7 wherein said support substrate includes a second protrusion and said mounting substrate includes a second opening for receiving said second protrusion.

9. A vibration gyroscope according to claim 1 wherein said vibration absorbing member is mounted on a main surface of said mounting substrate where said support member is mounted.

10. A vibration gyroscope according to claim 9 wherein said elastic paste is selected from the group consisting of urethane and silicone.

11. A vibration gyroscope according to claim 10 wherein said support member includes at least a first gate-shaped element support pins and said mounting substrate includes at least first holes for receiving said support pins of said first gate-shaped elements.

12. A vibration gyroscope according to claim 11 wherein said support member includes a second gate-shaped element defining support pins and said mounting substrate includes second holes for receiving said support pins of said second gate-shaped element.

13. A vibration gyroscope according to claim 12, wherein said support substrate includes a second extending element, said mounting substrate being supported on said first and second extending elements.

14. A vibration gyroscope according to claim 13, wherein said support substrate further includes at least a first protrusion and said mounting substrate includes at least a first opening for receiving said first protrusion.

15. A vibration gyroscope according to claim 14, wherein said support substrate includes a second protrusion and said mounting substrate includes a second opening for receiving said second protrusion.

16. A vibration gyroscope having:
a column-shaped vibrator;
a support member for supporting said vibrator at a location which is approximately its node;
a mounting substrate to which said support member is mounted, said support member including at least first and second gate-shaped elements defining support pins and said mounting substrate including at least first and second holes for receiving said support pins of said first and second gate-shaped elements;
a support substrate which is disposed opposite said mounting substrate, said support substrate including at least a first extending element, said mounting substrate being supported on said first extending element; and
a vibration absorbing member provided between said mounting substrate and said support substrate for absorbing vibration transferred to said mounting substrate from said vibrator through said support member, said vibration absorbing member being an elastic paste selected from the group consisting of urethane and silicone.

17. A vibration gyroscope according to claim 16, wherein said support substrate includes a second extending element, said mounting substrate being supported on said first and second extending elements.

18. A vibration gyroscope according to claim 17, wherein said support substrate further includes at least a first protrusion and said mounting substrate includes at least a first opening for receiving said first protrusion.

19. A vibration gyroscope according to claim 18, wherein said support substrate includes a second protrusion and mounting substrate includes a second opening for receiving said second protrusion.

20. A vibration gyroscope having:
a column-shaped vibrator;
a support member for supporting said vibrator at a location which is approximately its node;
a mounting substrate to which said support member is mounted, said support member including at least first and second gate-shaped elements defining support pins and said mounting substrate including at least first and second holes for receiving said support pins of said first and second gate-shaped elements;
a support substrate which is disposed opposite said mounting substrate, said support substrate including at least a first extending element, said mounting substrate being supported on said first extending element; and a vibration absorbing member for absorbing vibration transferred to said mounting substrate from said vibrator through said support member, said vibration absorbing member being mounted on a main surface of said mounting substrate where said support member is mounted and being made of an elastic paste selected from the group consisting of urethane and silicone.

21. A vibration gyroscope according to claim 20, wherein said support substrate includes a second extending element, said mounting substrate being supported on said first and second extending elements.

22. A vibration gyroscope according to claim 21, wherein said support substrate further includes at least a first protrusion and said mounting substrate includes at least a first opening for receiving said first protrusion.

23. A vibration gyroscope according to claim 21, wherein said support substrate includes a second protrusion and mounting substrate includes a second opening for receiving said second protrusion.

* * * * *